June 22, 1965    A. H. FORSMAN    3,190,646
WATER SKIING FACILITY
Filed July 25, 1961    5 Sheets-Sheet 2
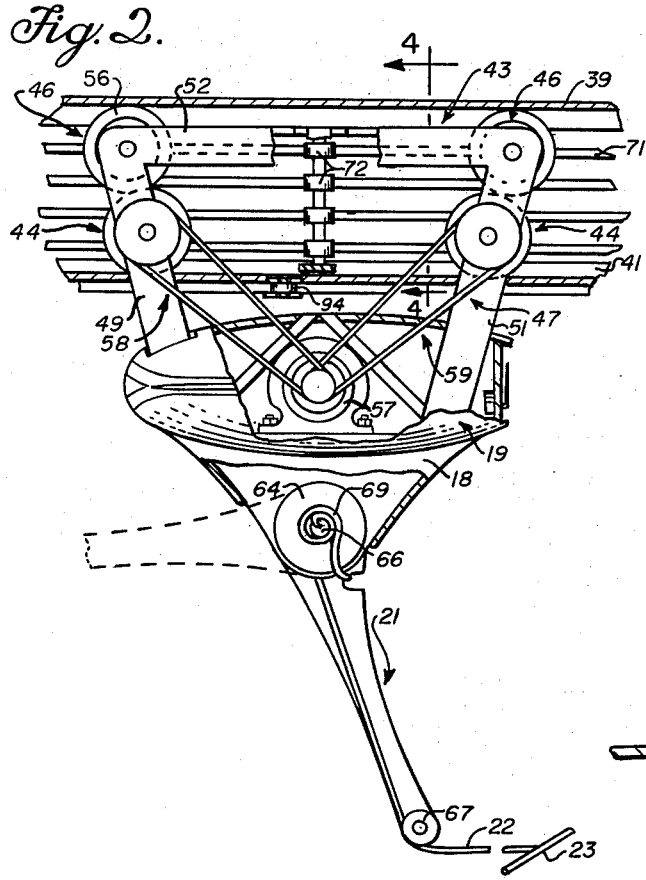
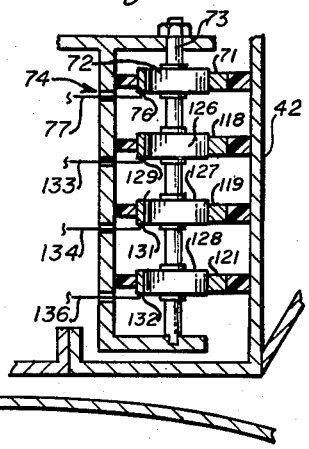
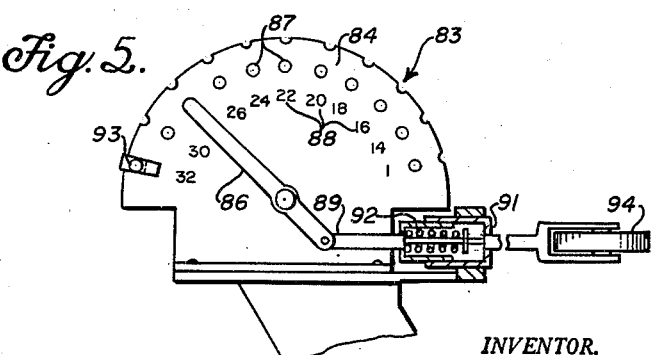
INVENTOR.
ARNOLD H. FORSMAN
BY
*Leonard Phillips*
AGENT June 22, 1965 A. H. FORSMAN 3,190,646
WATER SKIING FACILITY
Filed July 25, 1961 5 Sheets-Sheet 3
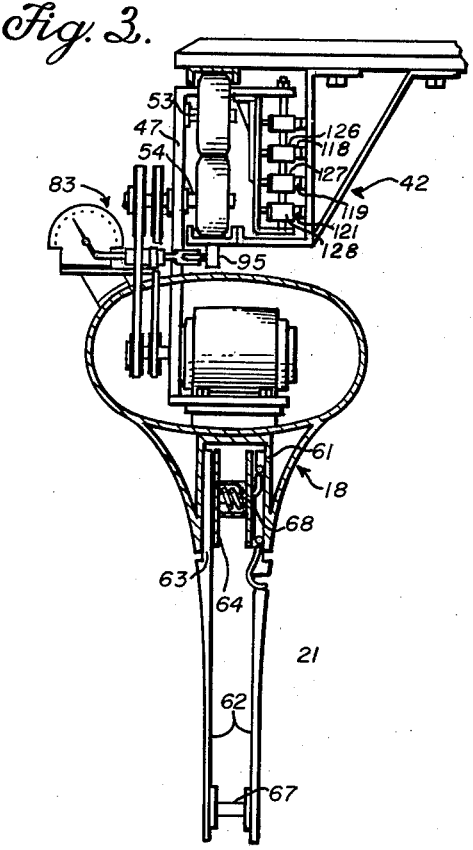
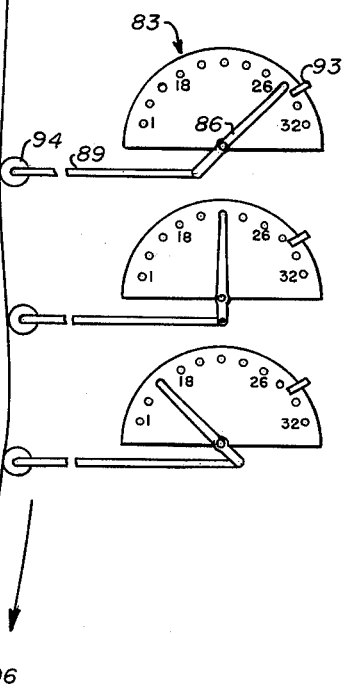
INVENTOR.
ARNOLD H. FORSMAN
BY
Leonard Phillips
AGENT

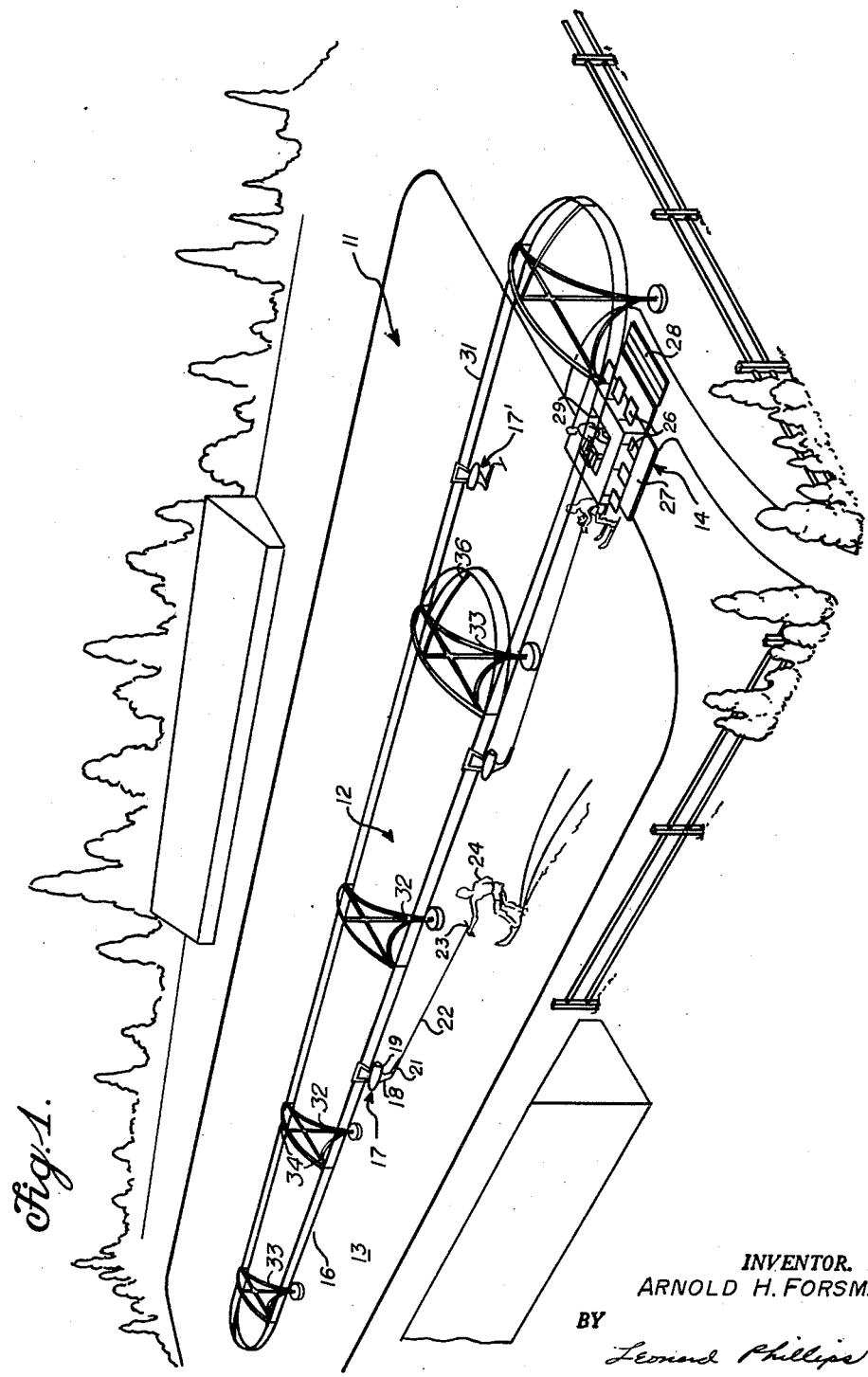

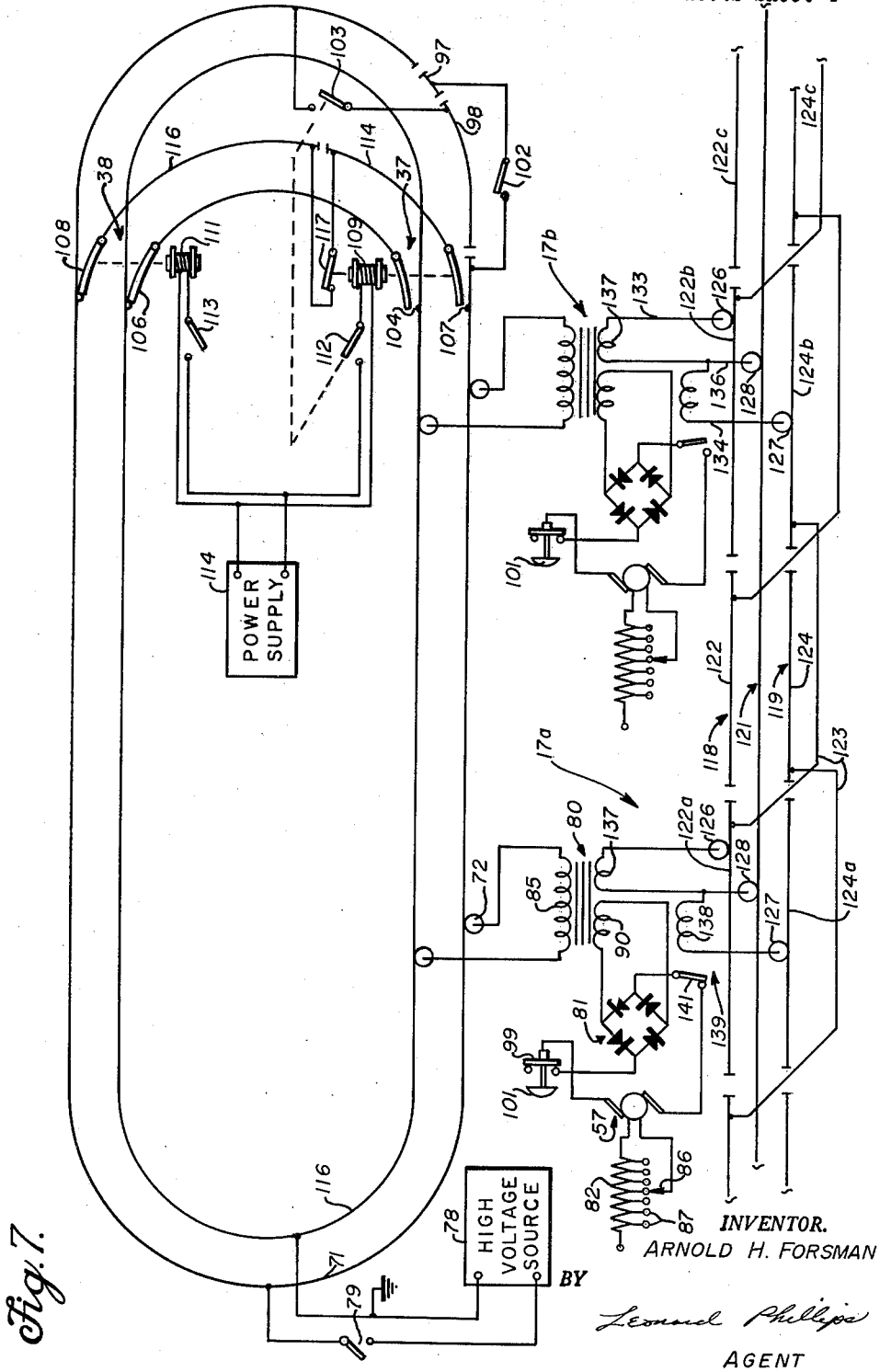

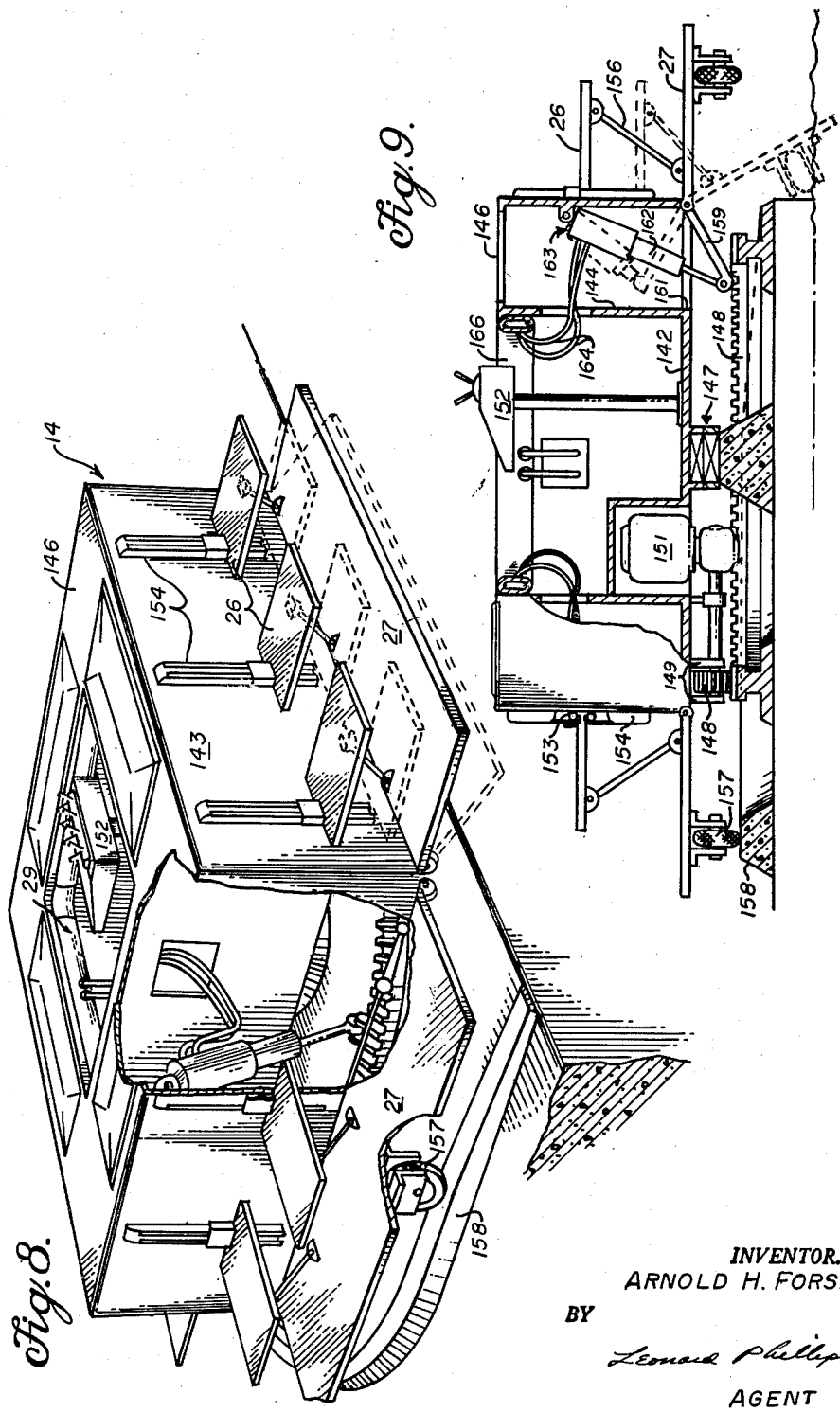

United States Patent Office

3,190,646
Patented June 22, 1965

3,190,646
WATER SKIING FACILITY
Arnold H. Forsman, 347 Ilo Lane, Danville, Calif.
Filed July 25, 1961, Ser. No. 126,661
5 Claims. (Cl. 272—32)

This invention relates to recreational facilities in general and is particularly directed to an automatic system for facilitating water skiing without the usual requirements of tow boats.

Water skiing has developed into one of the most popular recreational activities today. However, many enthusiasts are deprived of, or limited in their pursuit of this activity by virtue of the substantial expense associated with the auxiliary equipment required to partake of the sport. More specifically, a boat has customarily been a primary requisite in water skiing to facilitate towing of the skier. In order to water ski, one must have the services of a tow boat, and the facilitation of such services usually entails owing a boat or renting or chartering a boat. All of these possibilities of course involve considerable expense.

Present day water skiing is limited and disadvantageous in several further respects aside from the attendant expense. Considerable time and effort is consumed prior and subsequent each outing in loading and unloading all the equipment skiing behind a boat requires. Where one owns a boat, additional time and effort is involved in maintaining the boat, and time is wasted in journeying to a waterway because of the speed limitations imposed by the boat and trailer. Moreover, the generally crowded and precarious conditions attending boat towed water skiing render the sport somewhat hazardous. Aside from the rough water, boat wakes, and the like which are prevalent on waterways heavily populated by boat towed skiers, the lack of close supervision and regulations of the boat traffic are not conducive to entirely safe skiing conditions. Furthermore, safe launching facilities are not available to the skier at the usual waterway nor is towing by boat conducive to safe, spill free launching.

It is therefore an object of the present invention to provide a water skiing recreational facility which facilitates water skiing without necessity of tow boats and under fully controlled conditions of optimum launching and safety.

Another object of the invention is the provision of a facility of the class described which includes an overhead system of ski tow units.

Still another object of the invention is to provide a monorail ski tow system having a plurality of individual self-powered ski tow units guided along a continuous closed track system.

It is yet another object of the present invention to provide a ski tow system of the class described which includes proximity control means for automatically preventing successive tow units from overtaking each other.

Another object of the invention is the provision of an overhead rail ski tow system wherein the tow units are automatically, gradually accelerated and decelerated at the start and finish of the run and on turns to provide optimumly safe water skiing conditions.

It is still another object of the invention to provide a ski tow system of the class described wherein the speed of each tow unit is adjustable over a wide range.

It is a further object of the present invention to provide a water skiing facility that includes an automatic launching platform which conveys the skiers from an on-shore location to launching positions at an ideal launching height over the water.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the appended claims.

FIGURE 1 is a general overall semi-schematic perspective view of the water ski facility including water ski tow system and automatic launching platform, FIGURE 2 is an elevational view with portions broken away of one of the monorail ski tow units of the tow system, FIGURE 3 is a transverse sectional view through the tow unit of FIGURE 2, FIGURE 4 is an enlarged fragmentary sectional view taken at line 4—4 of FIGURE 2 illustrating elements of the power supply and proximity control means of the tow system, FIGURE 5 is a fragmentary view with portions broken away and on an enlarged scale of the acceleration control means depicted in FIGURE 3, FIGURE 6 is a semi-schematic view of the acceleration control means of FIGURE 5 depicting a reduction in tow unit speed effected thereby, FIGURE 7 is a schematic circuit diagram of the overall electrical control system of the monorail tow system, FIGURE 8 is a perspective view with portions broken away of the launching platform of the water skiing facility, and FIGURE 9 is an elevational view with portions broken away of the launching platform.

Considering now the invention in some detail and referring to the illustrated form thereof in the drawings, particularly FIGURE 1 thereof, there is provided a water ski facility 11 the principal elements of which include an ovehead ski tow system 12 supported above a body of water 13, and an automatic launching platform 14 positioned on the shore of the body of water and underlying the tow system. The tow system comprises an overhead track, preferably a continuous monorail 16 of oval configuration supported at a considerable distance above the surface of the water, and a plurality of tow units 17 movably suspended from the monorail. Each tow unit 17 is electrically powered for movement at a considerable velocity around the rail with the power for motivation being derived from an electrical distribution bus carried by the rail system. Each tow unit includes an arm 18 depending from a body housing 19 with a spring loaded towing arm 21 mounted on an elbow at the lower end of arm 18. A tow rope 22 with a handle 23 at its end extends from the towing arm 21 and is retractable therein by means subsequently described. Thus it will be appreciated that a water skier as schematically depicted at 24 may grasp the handle 23 in the usual manner and be towed behind the tow unit 17. Upon dropping the handle, the tow rope 22 is automatically retracted into towing arm 21 and in addition such arm swings up into a horizontal poistion (see unit 17' of FIGURE 1) well out of the way of any skiers or other objects on the water surface.

The launching platform 14 facilitates the ready introduction of the tow unit handles to the hands of the skiers and control and supervision of the overall facility, as well as conveyance of the skiers from the shore to launching positions at an ideal height from the water. More specifically, the launching platform is generally square with a plurality of peripheral seats 26 uniformly distributed on each side of the platform, e.g., three seats to a side. The platform is rotatable one-fourth turn at a time and each side thereof is provided with a hinged floor section 27 which is arranged to drop down when the platform is rotated to a position where the floor section overlies the water. The seats of each side, moreover, are arranged to move downwardly with the dropping of the corresponding floor section to horizontal positions which bring the skier to an ideal launching height from the water. Thus skiers may enter the platform from an on shore position indicated at 28, sit down upon the seats 26, and put on their skis. The platform is provided with a central recess 29 which is sufficiently large to contain the controls of the entire water ski facility as well as to accommodate an operator. The operator effects rotation of the platform a quarter turn at a time such that skiers having entered the platform from loading position 28 are conveyed to launching positions over the water after one-half turn. At this time the operator actuates a control which causes the corresponding floor section 27 to drop away and the seats 26 to lower the correct take-off height.

It is to be noted that the platform underlies a section of a stop-start and storage loop portion 31 of the monorail 16. This loop adjoins the main course oval of the monorail and passes over the shore to return over the water adjacent the platform. Tow units 17 disposed on the storage loop portion 31 come to a stand still at a position directly above the platform. Thus, the operator may readily hook the tow handle 23 of an overhead tow unit, as by means of a long handled hook, and give the handle to one of the skiers in launching position. When the operator ascertains that the main monorail loop is clear to receive a tow unit from the storage loop 31, he pushes a start button that energizes the first in line tow unit to accelerate same out on the main loop, thus towing the skier behind. The next in line tow unit moves to the starting position directly above the platform and stops, such unit remaining at a stand still until its tow handle is distributed to another of the skiers in launching position and the start button again pushed.

In addition to the general features of the ski facility just described, provision is made in the tow system 12 to insure optimumly safe water skiing conditions. The tow system is arranged such that tow units in approaching the main loop of the monorail are gradually accelerated to full speed. Likewise, the tow units are automatically gradually decelerated in approaching the curved end portions of the loop to a reduced around-turn speed and gradually re-accelerated to full speed upon entering a straight section of the loop. In addition, provision is made to gradually decelerate the tow units as they enter the storage loop 31 such that the skier may glide into shore at a safe speed. Further to the foregoing, the tow system includes proximity control means which maintains successive tow units at intervals greater than a predetermined safe distance. Thus all possibility of one skier overtaking another is automatically prevented.

Considering now the various elements of the water skiing facility generally described hereinbefore in greater detail, it is first to be noted that the monorail 16 is supported above the water as by means of a series of aligned, cantilever suspension towers 32, 33 of structural steel or equivalent material. These towers are placed at suitable intervals along a line traversing the long dimension of the body of water 13. The center towers 32 have opposed cantilever arms 34 extending at right angles to the line of towers while the pivot towers 33 have a suitable array of cantilever arms 36 placed in semicircular arrangement thereabout. The center towers are arranged between a pair of opposed pivot towers such that the monorail 16 as suspended from the arms 34, 36 of this arrangement of towers describes the continuous main loop oval of previous mention. Another of the pivot towers 33 is mounted on the shore of the body of water 13 adjacent the launching platform 14 and in spaced alignment to the corresponding pivot tower of the main loop. The stop-start and storage loop portion 31 of the monorail, which is of U-shaped configuration is suspended from the arms of the on-shore pivot tower and adjacent end pivot tower of the main loop. The side sections of the U-shaped portion 31 adjoin the straight side sections of the main oval and are respectively coextensive therewith. At the points of joinder between the stop-start and storage loop portion 31 and main oval, suitable two position rail switches 37, 38 are provided to facilitate the selective switching of the storage loop portion into and out of the main loop. The switches 37, 38 are remotely controlled from the launching platform 12 by the operator thereat in a manner subsequently described. Thus the operator may readily operate the rail switches to enable a tow unit leaving the start position above the launching platform to enter the main loop and thereafter to traverse the main loop one or more times prior to reentering the storage loop portion.

As best shown in FIGURES 2 and 3, the monorail 16, itself, is preferably comprised of upper and lower channels 39, 41 secured in vertically spaced opposition to support struts 42 which depend from the arms of the towers 32, 33. These channels define upper and lower guides which retain the tow units 17 during their powered excursions along the monorail system. With the monorail provided as just described, each tow unit 17 is preferably provided as having a wheeled truck assembly 43 which is secured to and overlies the body housing 19 of the unit. Such truck assembly includes front and rear sets of wheels 44, 46 arranged such that the lower wheel 44 of each set rollably engages the channel 41 while the upper wheels 46 thereof rollably engage the channel 39. More specifically, an eccentric bracket 47 projects upwardly from the housing 19 and extends longitudinally therealong in a plane transversely spaced from a vertical longitudinal median plane through the housing by a distance slightly greater than one half the web width of the channels 39, 41. The bracket is of invert, frustumated, isosceles triangular configuration in side elevation with a conformed central opening 48 therethrough. In other words, the bracket includes oppositely inclined, marginal side struts 49, 51 projecting from the housing and integrally interconnected at their upper ends by a longitudinal strut 52. The upper wheels 46 are respectively journalled at the apices of the bracket for rotation about transverse axes upon axles 53 projecting from the bracket through the intervening space between the channels. Similarly the lower wheels 44 are secured to axles 54 which respectively project transversely from the side struts 49, 51 through the space between the channels. The spacing between the axles 53, 54 is such that the upper and lower wheels of each set are in frictional engagement, and in this connection the wheels are best rimmed by tires 56 of rubber or equivalent material to insure a high coefficient of friction therebetween as well as traction with the channels. It is to be noted that when one wheel of each set is rotated, e.g., the lower wheel, the other wheel of the set is caused to rotate in a contra rotational direction by virtue of the frictional contact therebetween. Such contra rotation of the wheels of each set produces translation in a common direction along the rail in the rolling engagements of these wheels with their corresponding channels. By virtue of the eccentric positioning of the bracket 47, the body housing of the tow unit underlies the monorail in centered relation thereto as the truck wheels roll along the monorail channels.

To facilitate driving of the truck wheels of each tow unit, an electric motor 57 is mounted within the housing 19 thereof. The drive shaft of the motor is coupled as by means of pulley and belt drives 58, 59 to respectively the front and rear lower wheels 44 of the truck assembly. Thus upon energization of the motor, the lower wheels are driven to in turn drive the upper wheels in the manner described hereinbefore. The tow unit is hence propelled along the monorail and a skier grasping the tow rope handle 23 is pulled over the body of water 13.

With regard to the means mentioned hereinbefore for retracting the tow rope 22 into the tow arm 21 and pivoting the arm into a horizontal position upon release of the tow handle by a skier, it will be noted that the upper arm 18 of the tow unit is formed with a central longitudinally extending inverted channel 61 for receiving the upper end of the tow arm. The tow arm is provided for example as having a pair of transversely spaced side walls 62, having circular recessed bearing surfaces 63 at their upper ends which bear against the inner side walls of channel 61 and are rotatable relative thereto. A windup drum 64 is journalled between the side walls 62 of the tow arm adjacent its upper end as by means of a pivot pin 66 which also serves to pivot the tow arm side walls within the channel and to secure them together. A guide spool 67 is secured between the lower ends of the side walls 62. The drum is loaded as by means of a coil spring 68 concentrically secured between its hub and the pivot pin 66. The tow rope 22 is coiled upon the drum and led axially of the arm over the guide spool to be secured at its end to the tow handle 23 which is disposed exteriorly of the arm. The spring 68 causes the drum to rotate in a direction opposite that from which the tow rope is pulled from the drum. Hence when tension is released from the tow rope, such as by a skier dropping the handle 23, the drum rotates to coil the rope thereon and retract same within the tow arm. The end of the rope is stopped at the guide spool by virtue of the tow handle abutting the side walls of the arm thereat.

As previously mentioned, the tow arm 21 is also spring loaded for pivotal movement to a normal substantially horizontal position as depicted in phantom line in FIGURE 2. This is accomplished as by means of a coil spring 69 secured between one side wall of the arm and the pivot pin 66. When tension is placed on the tow rope, the arm is pivoted against the loading of the spring 69 downward to the position depicted in full line in FIGURE 2. Release of the rope enables the spring to return the arm to the horizontal position.

To facilitate energization of the electric motors 57 of the respective tow units, each unit is provided with a pickup trolley which is adapted to continuously engage a high voltage bus bar 71 insulatedly secured to the support struts 42 of the monorail system adjacent the open space between the channels 39, 41. The bus bar is generally continuous and preferably positioned on the opposite sides of the channels from the brackets 47 of the tow units supported thereon. The pick-up trolley of each tow unit then preferably comprises a conductive roller 72, insulatedly journalled upon a vertical shaft 73 secured to journal bracket structure 74. The bracket structure projects transversely from the bracket 47 through the space between the monorail channels 39, 41 into close proximity to the bus bar 71 such that the roller 72 engages same. A brush 76 projects from journal bracket structure 74 (see FIGURE 4) in insulated relation thereto, into engagement with roller 72, which brush is electrically coupled to one input terminal of the motor 57 by a circuit subsequently described that includes a lead-in conductor 77 connected to the brush and extending into the housing 19. The other input terminal of the motor is grounded to the housing 19, and a ground return circuit is provided through the housing, truck assembly 43, and rail channels 39, 41. A high voltage alternating current source 78 is then provided with one terminal connected to the rail channels 39, 41 and to ground, and the other terminal connected through a main power switch 79, located in the launching platform, to the bus bar 71. Thus when the bus bar is energized, the resulting high voltage thereon is continuously applied to the motors of the tow units through their respective trolley rollers 72 and associated input circuits as the units are driven along the monorail channels.

In order that the speeds of the tow units may be individually adjustable to suit the requirements of water skiers of varying skill, the motor of each unit has an associated adjustable speed control device. In this regard the motors are preferably direct current motors and a bridge rectifier 81 is included in the motor input circuit (see FIGURE 7) to convert the alternating current voltage derived from the bus bar 71 by the trolley roller 72 to direct current voltage suitable for energizing the motor. More particularly a transformer 80 disposed in the housing has its primary winding 85 connected between trolley input lead 77 and ground. A secondary winding 90 of the transformer is connected across bridge rectifier 81 and the latter is in turn coupled to the input terminals of the motor 57. A field rheostat 82 may then be provided connected to the field winding terminals of the motor to control the speed thereof in the well known manner in accordance with the rheostat resistance inserted in the field circuit. However, the mere provision for the adjustment of the speed of each unit to anyone of a plurality of selectable fixed values, does not facilitate water skiing under optimum conditions of enjoyment and safety. For example, where a tow unit is set for a particular speed, the abrupt assumption of this speed at the instant a skier is launched from the platform 14 would probably result in spilling the skier. Similarly, a fixed speed suitable for skiing on a straight-away portion of the tow system would be hazardous for skiing around a curved portion of the system and for gliding into the shore upon leaving the tow system. Accordingly, provision is made in the present invention for the adjustment of tow unit speed to a selectable maximum value and for the automatic gradual acceleration of the tow units from zero velocity to the maximum set speed subsequent to take-off. In addition, the system is arranged to automatically decelerate the units from maximum speed to a suitable lower speed around curved portions of the system and to reaccelerate the units to maximum speed upon their entry into a straight portion from a curved portion. The safety of the skiers is further enhanced by provision for the automatic deceleration of the tow units from maximum speed to a suitably lower speed upon their entry into the storage loop 31 whereby the skiers may glide into shore at a safe speed.

The foregoing is accomplished in the present invention by the provision of a speed control device 83 in each tow unit which is operable to appropriately increase or decrease the resistance setting of the rheostat 82 in accordance with the position of the tow units on the monorail system within limits imposed by a maximum speed setting. As best shown in FIGURE 5, the control device 83 comprises a semi-circular dial plate 84 mounted upon the housing 19 of each tow unit in a position that is accesible by an operator stationed in the launching platform 14. A contact arm 86 is pivotally mounted upon the dial with the pivot point being disposed at an intermediate position of the arm. One end of the arm traverses a semi-circular path along which a plurality of circumferentially spaced contacts 87 are disposed in the surface of the dial plate. The contacts are connected to successive equal resistance tapping points of the rheostat 82. The contact arm 86 is connected to one field terminal of the motor and rheostat 82 to the other whereby such arm functions as the variable resistance contactor of the rheostat. Each contact 87 is labeled as indicated at 88 with the speed of the tow unit effected by the corresponding field resistance selected by the contact arm. The distal end of the contact arm relative to the contacts is connected to a spring loaded actuating plunger 89 mounted upon the housing adjacent the base of the dial plate 84. More specifically, the plunger extends from the end of the contact arm transversely of the tow unit housing and slideably through a cylinder 91, rigidly secured thereto. A spring 92 is housed within the cylinder and secured to the plunger in such a manner as to normally urge the contactor arm towards the highest speed contact, e.g., in a counterclockwise direction in FIGURE 5. A stop 93, however, is carried by the dial plate on the increasing speed side of the contact arm which stop is movable along the path traversed by the end of the contact arm to a plurality of locked positions respectively adjacent the contacts 87. Thus, the contact arm as normally urged by the plunger is stopped at whatever speed contact the stop is placed adjacent. It will thus be appreciated that the preselected maximum speed of the tow unit is determined by the position of the stops, the plunger normally urging the contact arm towards highest speed position and therefore into engagement with the stop.

Reductions in speed below the preset maximum determined by the stop is effected by depression of the plunger against the spring loading thereof, plunger depression moving the contact arm towards its lowest speed position. Conversely, acceleration from a reduced speed to the preset maximum is effected upon extension of the plunger under the influence of the loading spring 92. Thus, the transverse position of the projecting end of the plunger determines the speed of the tow unit below the maximum value set by the stop. Accordingly, to the ends of the present invention, a cam follower roller 94 is journalled for rotation about a vertical axis at the projecting end of the plunger adjacent, for example, the lower channel of the monorail as best shown in FIGURE 3. Such roller rollably engages the side of a cam strip 95, secured to the bottom of the channel when the plunger is in fully extended position as permitted by the stop during movement of the tow unit along the monorail. Thus where the roller encounters the normal thickness of the cam strip, the contact arm abuts the stop and the tow unit travels at the predetermined maximum speed established by the particular stop setting.

Raised cam segments 96 as indicated in FIGURE 6 may then be included at predetermined locations along the cam strip for traversal by the roller to thereby depress the plunger and reduce the speed of the tow unit below that for which they are preset. More particularly, one of the cam segments is provided around the storage loop 31. The portion of the segment along the leg of the storage loop 31 between the launching platform and main loop is of maximum raised height above the launching platform and has a gradually tapered fall in the direction of the main loop to the normal thickness of the strip 95. The opposite end of the segment in the other leg of the storage loop has a gradually tapered rise in the direction of the shore from the normal strip thickness to maximum raised height adjacent the shore. The maximum raised height is then continued in the portion of the cam segment in the curved section of the storage loop that overlies the shore around to the launching platform. It will thus be appreciated that the cam segment described above, depresses the plunger of a tow unit at the launching platform to the maximum extent, thus adjusting the speed of the tow unit to a reduced value. As the tow unit progresses towards the main loop the plunger encounters the tapered fall of the cam segment and is gradually extended to rotate the contact arm towards the stop. The unit is hence gradually accelerated to the maximum preset speed at the end of the cam segment. Conversely a tow unit leaving the main loop at maximum speed and entering the storage loop encounters the tapered rise of the cam segment. The plunger of the control unit is hence gradually depressed to decelerate the unit and enable a water skier pulled by the unit to let go of the tow handle and glide into shore at a safe speed.

Cam segments 96 of a similar variety as that just described are likewise provided on the two end curves of the main loop of the monorail system. These cams have tapered rises in the directions of the curved sections which extend to constant maximum heights around the curves. The segments then have tapered falls from the constant heights in the direction of the straight sections. These cam segments thus serve to decelerate the tow units approaching the curved sections at maximum speed to a suitably reduced cornering speed and then to reaccelerate the units to maximum speed as they enter the straight sections.

By way of further example, a portion of one of the cam segments is shown in FIGURE 6 with the control device 83 of a tow unit schematically depicted at several successive positions along the cam segment. Prior to encountering the segment, the plunger 89 is fully extended and the contact arm 86 abuts the stop 93 which is set to a maximum speed of, for example 28 miles per hour. As the roller 94 moves to an intermediate position of the tapered rise of the segment, the plunger is depressed to a position that rotates the arm to its 22 miles per hour setting. When the roller surpasses the rise and is on the maximum height portion of the segment, the plunger is further depressed to a position that rotates the arm to its 16 miles per hour setting. The unit is hence automatically gradually decelerated to slightly more than half its maximum speed for cornering by the action of the cam segment and control device.

Considering now the further control of the tow units, particularly as regards the stopping and starting thereof, it will be noted that the bus bar 71 is provided with a positioning segment 97 adjacent the launching platform and an acceleration segment 98 which extends from the positioning segment to the juncture between the storage loop and main loop. The segments 97, 98 are insulated from the remainder of the bus bar as well as from each other. Thus a tow unit that encounters the positioning segment 97 comes to a full stop directly over the launching platform, such positioning segment being unenergized. Subsequent units following the first-in-line unit at the positioning segment bump into each other in end to end succession and are stopped on an energized section of the bus bar. These trailing units would hence normally tend to push the first unit off of the positioning segment. Moreover, it is undesirable from an economical standpoint for the units on the trailing portion of the storage loop to remain energized. Accordingly, each tow unit is provided with a bumper cut-off switch 99 at the forward end of the housing 19. As shown in FIGURE 7, the switch 99 is normally closed and connected in series with the bridge rectifier 81 and one input terminal of the motor. Hence when the switch is in its normally closed position, energizing circuit of the motor is closed. However, when the bumper 101 of the switch is depressed as occurs when the tow unit collides with another tow unit in front of it, the switch is opened, thus deenergizing the motor. Therefore, all succeeding units that pile up behind the first-in-line unit at the positioning segment are deenergized by their respective bumper switches. When the first-in-line tow unit moves off of the positioning segment, the bumper of the next in line unit is released to thereby close the switch and energize its motor. The next-in-line unit is now driven to the unenergized positioning segment whereat it stops. The bumper switches of the following trailing units are likewise released in turn such that they move up into end to end contact behind the unit at the positioning segment.

It will be noted that a positioning switch 102 is connected between the positioning segment 97 and the energized portion of the bus bar. This switch is normally open to retain the positioning segment in a normally unenergized condition. The switch 102 is located in the launching platform 14 at the finger tips of the operator. Thus to move the first-in-line tow unit from the positioning segment to the acceleration segment 98, the operator briefly closes the switch 102 to momentarily energize the positioning segment. As noted hereinbefore, the next in line unit then moves to the positioning segment. The tow unit at the acceleration segment stops since this segment is likewise normally unenergized. The operator now hooks the tow handle of this unit and presents it to one of the water skiers in launching position on the platform 14. When the skier is ready to be towed, the operator closes an acceleration switch 103 that is connected between segment 98 and the energized portion of the bus bar. The acceleration segment is hence energized and the first-in-line tow unit is accelerated along the corresponding leg of the storage loop towards the main oval under the control of the speed control means previously described.

In order that the tow unit accelerated from the platform along the storage loop towards the main loop may enter the latter, or vice versa upon traversing the main loop several times, the rail switches 37, 38 of previous mention must be actuated to their positions connecting the legs of the monorail storage loop to the straight sections of the monorail main loop while simultaneously disconnecting the normal curved end portion of the main loop from its remainder. In addition provision must be made to switch the corresponding sections of the bus bar 71 simultaneously with the monorail sections. Accordingly, the switches 37, 38 preferably respectively include monorail sections 104, 106 and bus bar sections 107, 108 which are included at the ends of the curved end portion of the main monorail loop and the ends of the corresponding section of the bus bar adjacent same. The monorail and bus bar sections are respectively unitarily pivotal between positions out of, and in engagement with the straight portions of the main loop and the adjacent portions of the bus bar at their junctures with the storage loop and corresponding portions of the bus bar. Thus when the switch sections are in their engaged positions the curved end portion is coupled to the remainder of the main oval and the corresponding portions of the bus bar are interconnected to complete same. When the switch sections are disengaged, the curved end portion and corresponding section of bus bar are removed from the outside loop that includes the storage loop portion 31.

To facilitate actuation of the switches 37, 38 under the direct control and supervision of the operator stationed in the launching platform 14, they are best provided with operating solenoids 109, 111 adapted for selective remote energization from the launching platform. More expressly, the solenoids 109, 111 are respectively connected through circuit switches 112, 113 to a source of control current such as power supply 114. The rail switches are normally closed such that when the circuit switch is closed and the solenoid 109 energized, the rail switch 37 is opened to its disengaged position and a tow unit leaving the launching platform enters the main loop. When the unit approaches the end of the far straight section of the main loop it would normally pass over the normally closed rail switch 38 into the curved end portion of the main loop for another traversal thereof. However, at the end of several traversals of the main loop when it is desired that the tow unit be switched into the storage loop, the circuit switch 113 is closed to thereby open the rail switch 38 and connect the far straight portion of the main loop to the storage portion.

In some instances the rail switch 38 may be in its normally closed position thus allowing a tow unit to enter the curved end portion of the main loop and the rail switch 37 to be actuated to permit another tow unit leaving the launching platform to enter the main loop. The switch 37 is then unactuated to revert to normally closed position immediately after the latter tow unit enters the main loop to permit the former tow unit traversing the curved end portion to enter the near straight portion thereof. Such manipulation of the track switches of course requires proper timing and distance between the tow unit leaving the launching platform and the oncoming tow unit traversing the curved end portion. A collision might possibly occur between the tow units in the event the operator misjudges the foregoing factors. To prevent this possibility of collision, suitable interlock switching means are provided in accordance with the present invention between the acceleration circuit switch 103 and the rail switch 37. More explicitly, the bus bar portion adjacent the curved end of the main loop is provided in two segments 114, 116 insulated from each other. Rail switch 37 has an auxiliary normally closed switching contact 117 connected between bus bar segments 114, 116, and the circuit switch 112 is mechanically connected, or ganged, with acceleration switch 103 for corresponding movement therewith. Thus when the acceleration switch 103 is closed, the circuit switch 112 is closed and the normally closed sections 104, 106 are opened thus enabling the tow unit approaching from the launching platform to enter the main loop. The switching contact 117 simultaneously opens to thus render bus bar segment 114 unenergized. Thus, an oncoming tow unit on the curved end portion of the main loop too closely approaching the rail switch 37 encounters the "dead" bus bar segment 114 and is stopped, hence averting a possible collision.

It will be appreciated that trailing tow units on the monorail system 16 might overtake leading tow units and collide therewith under various circumstances, such as when the leading unit breaks down and stops. The foregoing is prevented from occurring, however, by the proximity control means of previous mention which constitutes an important adjunct to the safety of the overall water ski facility. The proximity control means includes a segmented sending current bar 118, segmented receiving current bar 119, and a continuous common current bar 121, which are mounted upon the monorail channel supporting strut structure 42, preferably subjacent supply bus bar 71 (see FIGURE 4). These proximity control bars are provided around the entirety of the main loop of the monorail, as well as on the straight portions of the storage loop 31. In other words, the proximity control bars are provided on all parts of the monorail system that overlie the body of water 13. The segments 122 of the sending current bar 118 are respectively connected, as by means of jumpers 123, to the segments 124 of the receiving current bar 119 two groups of segments therefrom in the opposite direction from that of tow unit movement along the monorail (see FIGURE 7).

Considering now the manner in which the proximity control bars prevent the tow units from overtaking each other, it will be noted that each tow unit is provided with sending, receiving, and common proximity control trolley rollers 126, 127, and 128 which are preferably insulatedly journalled upon shaft 73, subjacent to rollably engage the bars 118, 119, 121. Brushes 129, 131, 132 mounted upon the bracket structure 74, slidably contact rollers 126, 127, 128 and lead-in conductors 133, 134, 136 are in turn connected to the brushes and extend into the housing 119. Within the housing, the conductors 133, 136 to the sending and common trolley rollers are connected to the opposite terminals of a second secondary winding 137 of transformer 80. In addition, the common conductor 136 is connected to one side of the operating solenoid 138 of a relay 139, the other side of the relay being connected to the conductor 134 coupled to the receiving trolley roller 127. Relay 139 includes a normally closed contact 141 which is connected between the bridge rectifier 81 and one input terminal of the motor 57.

With the foregoing arrangement it will be appreciated that sending trolley rollers 126 of the tow units, e.g., units 17a and 17b as depicted in FIGURE 7, apply voltage from their respective transformer windings 137 to the sending current bar segments 122 contacted by the sending trolley rollers. In the illustrated example, voltages are hence established on sending segments 122a and 122b. By virtue of the jumpered connections between the sending segments and receiving segments two groups of segments behind, the voltage on sending segment 122a likewise appears on receiving segment 124b while that and segment 122b appears on another tailing receiving segment not shown in the figure. When the trailing tow unit 17b was adjacent the group of segments 122c, 124c, no voltage was applied to its receiving trolley roller 127, receiving segment 124c being unenergized. No current hence flowed in the relay solenoid 138 of this unit and the contacts 141 were in their normally closed position completing the energization circuit to the motor 57. The leading tow unit 17a as disposed adjacent segments 122a and 124a is illustrated as being in a similarly energized state. However, when tow unit 17b moves to its illustrated position adjacent segments 122b, 124b, its receiving trolley engages the receiving segment 124 energized from tow unit 17a adjacent segments 122a, 124a two groups of segments ahead. A current hence flows through a current path including the winding 137 and sending and common trolley rollers 126, 128 of unit 17a, sending segment 122a, receiving segment 124b the receiving and common trolley rollers 127, 128 and relay solenoid 138 of unit 17b, and the common current bar 121. Consequently, the relay of the trailing unit 17b is actuated thereby opening its contacts 141, as indicated in the figure, and deenergizing the motor 57 of the trailing unit. The tow unit 17b is consequently stopped two groups of segments behind unit 17a and a possible collision is automatically averted. When unit 17a moves beyond the segments 122a, 124a, the voltage is of course removed from receiving segment 124b such that the relay contacts of the unit 17b revert to their normally closed position and operation of this unit is restored.

Considering now the launching platform 14 in greater detail as to its preferred structure and referring to FIGURES 8 and 9, it is to be noted that the platform includes a square central base floor 142 to the edges of which the side floor sections 27 are respectively hinged. Upright marginal side walls 143 extend upwardly from the edges of the base floor and central walls 144 project upwardly from the base floor in inwardly spaced relation to the side walls to define the recess 29. The space between the walls 143, 144 is closed by a covering wall 146, thus providing a boxed-in peripheral enclosure about the central recess 29.

The base floor 142 is centrally journalled for rotation about a vertical axis by means of a main bearing 147 mounted upon the shore of the body of water 13 at a distance spaced from the water's edge equal to substantially one-half the base floor side dimension. Thus when the base floor is rotated the floor edges are successively brought to a position that is substantially flush with the water's edge and wherein the corresponding floor side section 27 overlies the water. To facilitate rotation of the floor, a ring gear 148 may, for example, be mounted on the shore concentrically about the bearing 147. A spur gear 148 journalled between depending brackets 149 at the underside of the floor is driven by means of a motor 151 and engages the ring gear to thereby rotate the platform. The motor may be energized to effect rotation of the platform a quarter turn at a time by the operator actuating a switch included with the various tow system control switches on a control console 152 located in the central recess 29.

It will be recalled that the side floor sections 27 are arranged to drop away and the seats 26 to lower to correct take-off height when the side sections are rotated to the position overlying the water. The foregoing is preferably accomplished by the seats being provided with rollers 153 which are contained in and engage vertical guide channels 154 secured to the marginal side walls 143 of the platform. The seats are hence vertically moveable between various horizontal positions by virtue of the rollers rolling within the channels. The vertical movement of the seats is correlated to the dropping down pivotal movement of the side floor sections 27 by means of tie rods 156 pivotally secured at their upper ends to the seats and at their lower ends to the corresponding floor section. Thus when a floor section overlying the water pivots down to the dashed line position indicated in FIGURE 9, the tie rods pull the seats associated with this floor section vertically downward to a lower horizontal position as indicated in dashed lines in the figure. The extent of downward travel of the seats is arranged to provide a final lower position that is at an optimum height above the water surface for launching of water skiers seated on the seats. In such position the skis of the skiers are in the water, the floor section having dropped from beneath the seats.

In order that the side floor sections 27 be horizontally supported when they are in their onshore positions during rotation of the platform, each floor section has a depending wheel 157 adjacent its outer side edge at a medial position therealong. The wheels roll upon an elevated support track 158 of generally semi-circular configuration in plan which is mounted on the shore beneath the platform. The ends of the leg portions of the track abruptly terminate at the water's edge. Hence the floor sections are supported in horizontal positions by the wheels rolling upon the track when the floor sections overlie the shore. When a floor section is rotated over the water, however, its wheel leaves the end of the track, thus facilitating downward pivotal movement of the floor section.

To facilitate control of the pivotal movement of the floor sections, each one thereof is provided with a rigid lever linkage 159 projecting from its inner edge downwardly beneath the base floor 142. Slots 161 are provided in the floor to permit the linkages 159 to move upwardly therethrough when the floor side sections pivot downwardly. Each linkage is pivotally connected at its end to the piston 162 of a double acting pneumatic or hydraulic cylinder 163 disposed in the peripheral enclosure between the walls 143, 144. The bodies of the cylinders are pivotally secured at their distal ends relative to the linkages to the interior surface of the side walls 143 adjacent the corresponding floor sections 27. Working fluid pressure tubes 164 are connected between the cylinders and a distribution manifold 166 through control valves (not shown) in the conventional manner. The valves are arranged to supply the pressurized fluid to the cylinders to maintain them in normally extended positions, as depicted in full line in FIGURE 9, bearing downwardly upon the ends of the corresponding linkages 159 and thereby maintaining floor side sections 27 horizontal. When a floor side section is in its position over the water and unsupported by the wheel 157 resting upon the track, the operator actuates the valve that controls the corresponding cylinder to force its piston to retracted position as indicated in dashed line in FIGURE 9. The linkage is consequently forced upwardly by the piston movement to thereby pivot the floor section downward. After the skiers on the seats associated with this floor section are launched the operator effects movement of the piston of the corresponding cylinder to its normally extended position by appropriate manipulation of the valve. The floor section is thus raised to horizontal position and the platform may be rotated to position the wheel of this floor section upon the track 158 and place another floor section over the water.

In summary it is to be noted that there is provided by the present invention a complete waterskiing facility which facilitates boat-less water skiing under optimum conditions of enjoyment and safety. The waterskiers enter the launching platform 14 and sit astride the seats 26 with their skis resting upon the underlying floor side section 27. As the platform rotates a quarter-turn at a time under the control of the operator in the central recess 29, the skiers may suitably adjust their skis and prepare themselves for launching. Finally, the skiers are conveyed into position above the water at which time the side section is dropped by the operator's actuation of the associated cylinder 163. The seats 26 are correspondingly dropped to a proper launching height wherein the skis of the skiers astride the seats dangle in the water. The operator then actuates positioning switch 102 to move the tow unit 17 on the positioning segment 97 of the monorail 16 onto the accelerating segment 98 thereof. The operator hooks the tow handle 23 of this unit and directs same into the hands of one of the skiers in launching position. The acceleration switch 103 is now closed by the operator to energize the tow unit on the accelerating segment 98. The tow unit is gradually accelerated under the control of its speed control device 83 and the cams 95 and 96 to the full speed set by the stop 93 of the speed control device, thus towing the skier behind. Actuation of the acceleration switch 103 effects simultaneous opening of the normally closed rail switch 37 to permit the tow unit to enter the main loop of the monorail system. The skier hence is towed along the main loop by the tow unit at maximum speed on the straight-aways and a safe reduced cornering speed around the curved end portions of the loop, the necessary speed reduction and acceleration being automatically controlled by the control device 83 and cams 95 and 96. When the skier traverses the main loop one or more predetermined number of times constituting a "ride," the operator actuates circuit switch 113 to thereby open rail switch 38. The tow unit then enters the storage and take-off loop 31. The tow unit is automatically decelerated at this time by the speed control device and cams to enable the skier to glide into shore at a safe speed. The tow unit is stopped on the storage loop 31 upon its bumper switch 99 abutting another tow unit positioned thereon.

Of course, were the particular tow unit just mentioned to approach the rail switch 37 at a time another unit was approaching the switch from around the curved end portion of the main loop, a possible collision would be prevented by virtue of the interlock contacts 117 and associated arrangement of the bus bar segments 114, 116. The oncoming tow unit on the curved end portion would have been automatically stopped adjacent the bus bar segment 114 short of the rail switch 37. In addition, were the tow unit to approach another unit stalled ahead on the monorail, a collision would be prevented by the proximity control means that includes the control bars 118, 119, 121. The oncoming tow unit would be automatically stopped two segments of the control bars behind the stalled unit.

What is claimed is:

1. Water ski tow means comprising a continuous closed loop overhead monorail overlying a body of water, fixed support means suspending and positioning said monorail, a plurality of individually self-powered tow units movably suspended from said monorail, each of said tow units including a body with a support arm depending therefrom, a towing arm hinged to said support arm, resilient means attached to said support arm and towing arm and biased to urge said towing arm into a normally horizontal position, and an extensible tow rope secured to said tow arm by resilient means urging said rope into a retracted position.

2. Ski tow means according to claim 1, further defined by each of said tow units having a speed control device comprising a cam structure on said monorail and a tow unit power control structure on each of said tow units co-acting with said cam structure to selectively vary the speed of each tow unit with respect to its position on said closed-loop monorail.

3. In a water ski towing system, a plurality of tow units, each of said ski tow units comprising a wheeled truck for rollably engaging an overhead rail, a body housing depending from said truck, motive means carried within said housing and coupled in driving relation to the wheels of said truck independent motive control means attached to said motive means for individually controlling each of said tow units, a tow arm depending from said housing, and a tow rope extending from said tow arm.

4. A ski tow unit comprising a wheeled truck for rollably engaging an overhead rail, a body housing depending from said truck, motive means carried within said housing and coupled in driving relation to the wheels of said truck, a tow arm pivotally secured to said housing, resilient means attached to said housing and towing arm and biased to urge said towing arm into a normally horizontal position, a spring loaded drum rotatably mounted on said arm, and a tow rope coiled upon said drum and having an end extending from said arm connected to a tow handle.

5. A ski tow unit according to claim 4, further defined by said motive means comprising an electric motor mounted within said housing, and pick-up trolley means connected to said motor and secured to said housing for rolling engagement with a bus bar carried by said overhead rail.

References Cited by the Examiner

UNITED STATES PATENTS

| | | | |
|---|---|---|---|
| 567,487 | 9/96 | Mann | 104—153 |
| 1,133,977 | 3/15 | Lamb | 115—8 |
| 1,159,519 | 11/15 | Menier. | |
| 1,249,346 | 12/17 | Dellamore | 104—38 |
| 1,515,948 | 11/24 | Hammond. | |
| 1,640,982 | 8/27 | Cresci | 104—38 |
| 1,733,069 | 10/29 | Naud et al. | 105—153 |
| 1,886,484 | 11/32 | Kline | 104—149 |
| 1,891,059 | 12/32 | Rosenthal | 104—149 |
| 1,930,780 | 10/33 | Soules | 104—121 |
| 2,017,404 | 10/35 | Lorig | 104—93 |
| 2,019,976 | 11/35 | Huebscher | 246—182 |
| 2,084,879 | 6/37 | Weise | 104—153 |
| 2,187,424 | 1/40 | Johnson | 246—187 X |
| 2,318,354 | 5/43 | Anjesky | 105—153 |
| 2,404,376 | 7/46 | Henderson | 104—93 |
| 2,436,590 | 2/48 | Morre | 191—23 |
| 2,443,387 | 6/48 | Harris | 191—23 |
| 2,688,931 | 9/54 | Spafford | 104—88 |
| 2,803,743 | 8/57 | Ballerait | 246—182 |

FOREIGN PATENTS

| | | |
|---|---|---|
| 571,500 | 1/58 | Italy. |

LEO QUACKENBUSH, *Primary Examiner.*

JAMES S. SHANK, *Examiner.*